(12) United States Patent
Sato et al.

(10) Patent No.: US 12,020,371 B2
(45) Date of Patent: Jun. 25, 2024

(54) APPARATUS, METHOD, AND STORAGE MEDIUM FOR COMPRESSING DATA ABOUT TEXTURE OF AN OBJECT

(71) Applicant: CANON KABUSHIKI KAISHA, Tokyo (JP)

(72) Inventors: Masaharu Sato, Kanagawa (JP); Akira Shibasaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 17/710,751

(22) Filed: Mar. 31, 2022

(65) Prior Publication Data

US 2022/0319107 A1 Oct. 6, 2022

(30) Foreign Application Priority Data

Apr. 5, 2021 (JP) .................................. 2021-063945

(51) Int. Cl.
*G06T 15/50* (2011.01)
*G06T 9/00* (2006.01)

(52) U.S. Cl.
CPC ............ *G06T 15/506* (2013.01); *G06T 9/001* (2013.01)

(58) Field of Classification Search
CPC ..... G06T 15/506; G06T 9/001; G06T 11/001; G06T 9/00; G06T 7/514; G06V 10/60; G06V 30/18124
See application file for complete search history.

(56) References Cited

U.S. PATENT DOCUMENTS

| 9,299,188 | B2* | 3/2016 | Karsch | .................... G06T 7/536 |
| 2009/0279807 | A1* | 11/2009 | Kanamorl | ............ G02B 5/3025 |
| | | | | 348/222.1 |
| 2017/0180694 | A1* | 6/2017 | Stauder | .................. H04N 23/88 |
| 2021/0133929 | A1* | 5/2021 | Ackerson | .............. G06T 3/4092 |

FOREIGN PATENT DOCUMENTS

WO 2018123801 A1 7/2018

* cited by examiner

*Primary Examiner* — Antonio A Caschera
(74) *Attorney, Agent, or Firm* — CANON U.S.A., INC. IP Division

(57) ABSTRACT

An apparatus includes a first acquisition unit configured to acquire specular reflection information about specular reflection light on an object, a second acquisition unit configured to acquire diffuse reflection information about diffuse reflection light on the object, and a compression unit configured to compress the diffuse reflection information based on the specular reflection information.

20 Claims, 18 Drawing Sheets

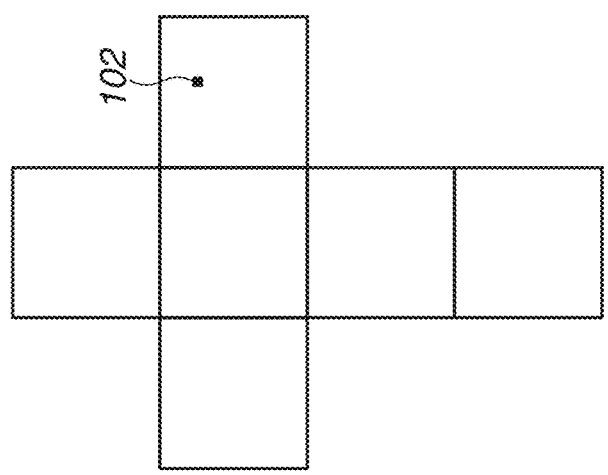
FIG.1A
FIG.1B
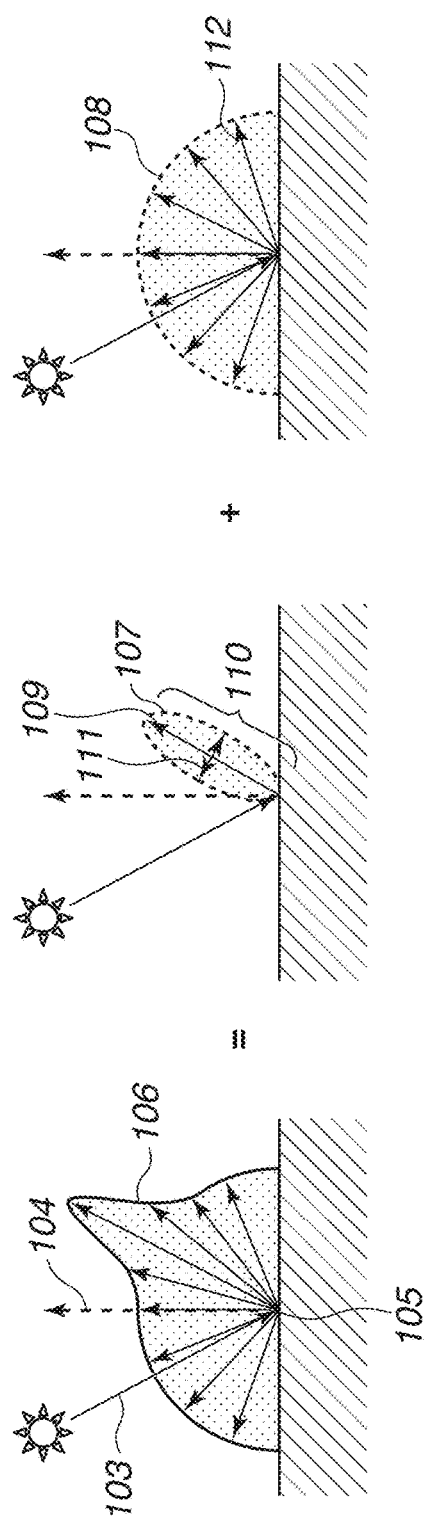
FIG.1C

FIG.5
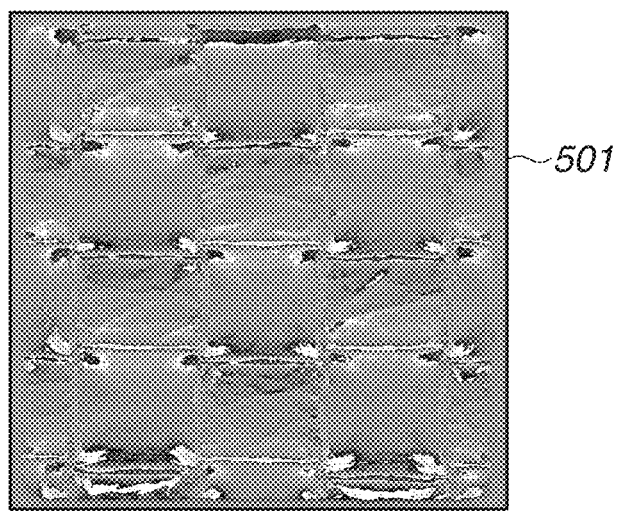
501
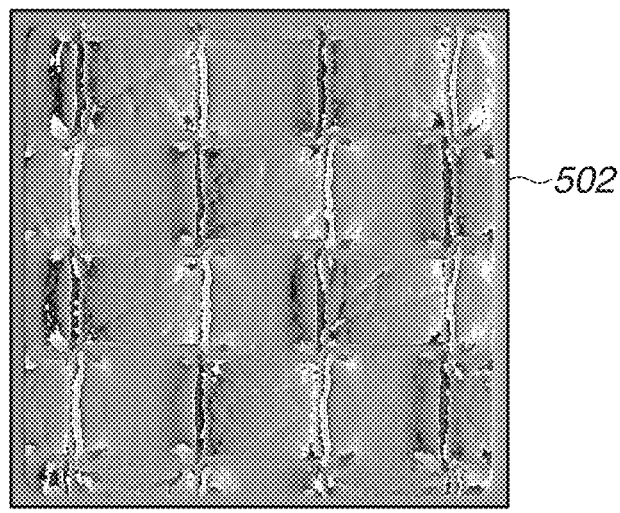
502
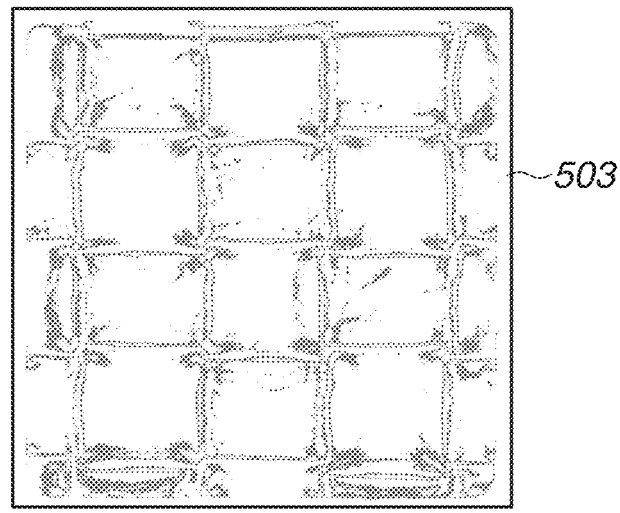
503

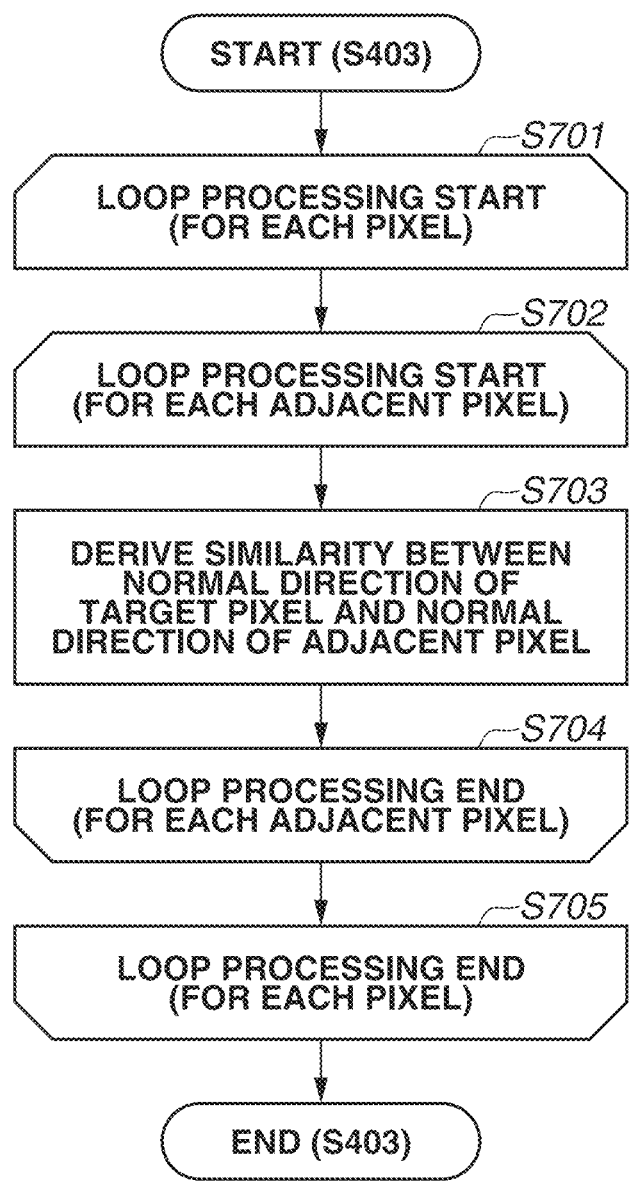

APPARATUS, METHOD, AND STORAGE MEDIUM FOR COMPRESSING DATA ABOUT TEXTURE OF AN OBJECT

BACKGROUND

Field of the Disclosure

The aspect of the embodiments relates to a technique of compressing data about texture of an object.

Description of the Related Art

To reproduce texture of a material or texture of painting of an object, measured data of reflection characteristics according to illumination directions or observation directions is used. In general, the reflection characteristic data includes information about diffuse reflection and specular reflection on an object and information about minute roughness of a surface of an object, and thus is characterized in that the data amount thereof is larger than that of still image data. As a data compression technique, International Application Publication No. WO 2018/123801 discusses a technique of compressing a depth image using a two-dimensional image compression method.

The pieces of information included in the reflection characteristic data are associated with each other and have an influence on the visual state of the object. Accordingly, if the compression processing as described in International Application Publication No. WO 2018/123801 is performed separately on the pieces of information, the texture of the object expressed using the reflection characteristic data may sometimes significantly deteriorate.

SUMMARY OF THE DISCLOSURE

According to an aspect of the embodiments, an apparatus includes a first acquisition unit configured to acquire specular reflection information about specular reflection light on an object, a second acquisition unit configured to acquire diffuse reflection information about diffuse reflection light on the object, and a compression unit configured to compress the diffuse reflection information based on the specular reflection information.

Further features of the disclosure will become apparent from the following description of exemplary embodiments with reference to the attached drawings.

BRIEF DESCRIPTION OF THE DRAWINGS

FIGS. 1A, 1B, and 1C are schematic diagrams illustrating reflection characteristics.

FIG. 5 is a schematic diagram illustrating normal information.

FIG. 7 is a flowchart illustrating processing of evaluating specular reflection information.

DESCRIPTION OF THE EMBODIMENTS

Figure 2:
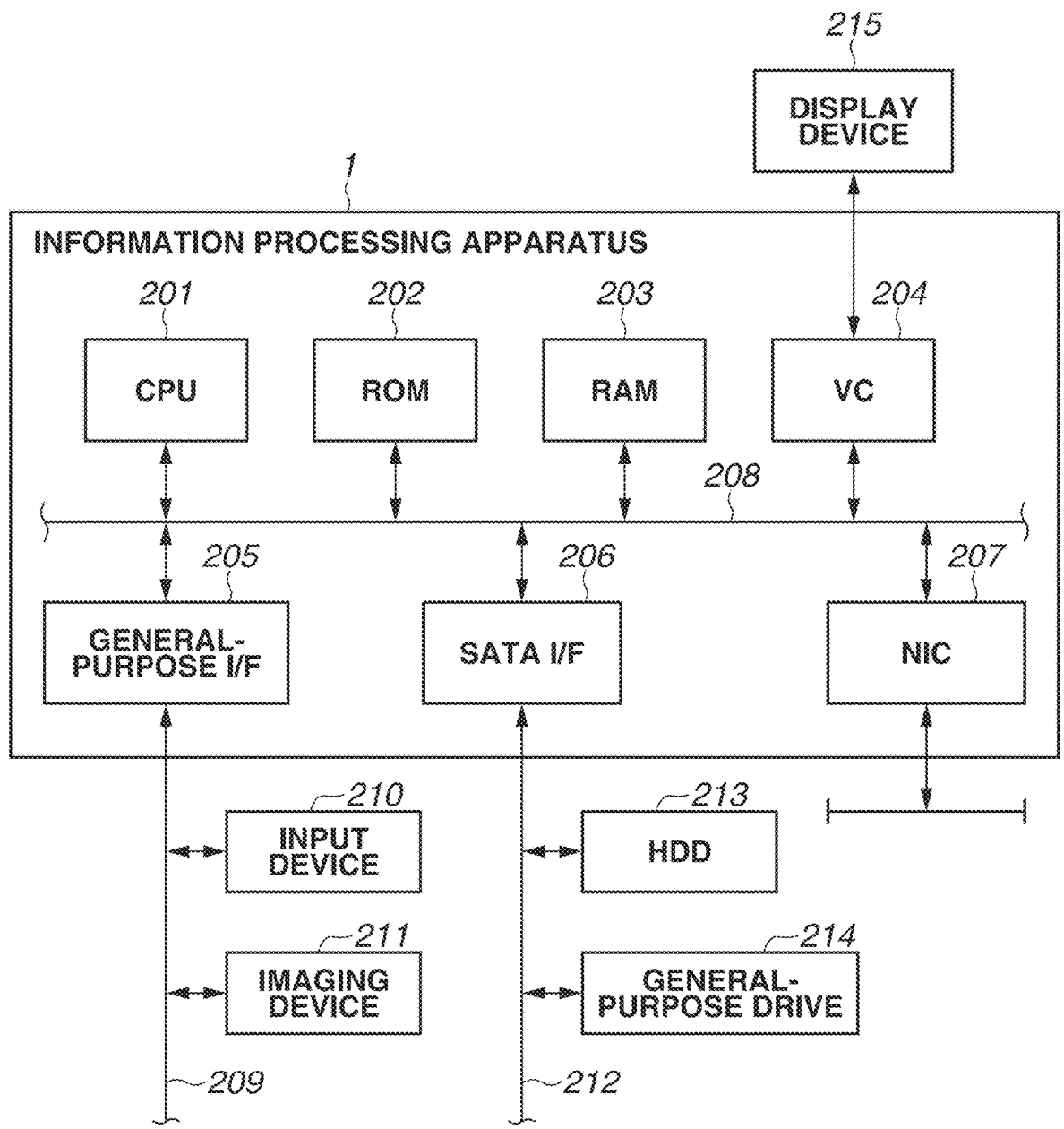
FIG. 2 is a block diagram illustrating a hardware configuration of an information processing apparatus.

Hereinbelow, various exemplary embodiments will be described with reference to the attached drawings. Note that the exemplary embodiments described below are not necessarily intended to limit the disclosure. In addition, all the combinations of features described in the exemplary embodiments are not necessarily essential.

A first exemplary embodiment will be described. In the present exemplary embodiment, processing to reduce a data amount of reflection characteristic data including specular reflection information and diffuse reflection information. More specifically, based on the specular reflection information, a compression parameter to be used for compressing the diffuse reflection information is determined, and based on the compression parameter, the diffuse reflection information is compressed. First, reflection characteristics of an object will be described with reference to FIGS. 1A, 1B, and 1C.

FIG. 1A is a schematic diagram illustrating an object 101, and FIG. 1B is a development diagram of the surface of the object 101. The object 101 has a reflection characteristic at each position on the surface. In the present exemplary embodiment, for simplification of descriptions, the object 101 is described to have a cubic shape. The shape of the object 101 may also be a two-dimensional shape such as a flat surface in addition to the three-dimensional shape such as a cubic shape. As illustrated in FIG. 1B, the surface of the object 101 can be represented by the development diagram including 6 surfaces. FIG. 1C is a diagram illustrating a reflection characteristic at a position 102 on the object 101. Reflection light 106 obtained when light is emitted from a certain direction 103 to a point 105 on the object surface with a normal line 104 has a different intensity depending on each reflection direction. The reflection light 106 can be modeled using a dichroism reflection model. More specifically, the reflection light 106 can be separated into a specular reflection light component 107, which is light reflected at a boundary surface between sky and the object 101, and a diffuse reflection light component 108, which has passed through the boundary surface and is diffused inside the object 101.

The specular reflection light component 107 has a characteristic of being observed intensely near a specular reflection direction. The specular reflection light component 107 is characterized by three elements, i.e., a specular reflection direction 109, in which the intensity of the specular reflection light component 107 is maximum, a specular reflection intensity 110, which is a reflection intensity in the specular reflection direction 109, and a spread width 111 of the specular reflection light component 107 with the specular reflection direction 109 as a center.

Further, the specular reflection direction 109 changes depending on a direction of the normal line 104. The diffuse reflection light component 108 has a characteristic of being observed to have approximately equal intensities in all directions. The reflection intensity of the diffuse reflection light component 108 is referred to as a diffuse reflection intensity 112.

The reflection characteristic at a position on the object surface can be described with a four-dimensional function referred to as Bidirectional Reflectance Distribution Function (BRDF). Further, the reflection characteristics of the object surface can be described with a six-dimensional function referred to as Spatially-Varying (SV) BRDF, in which BRDF changes depending on a position. Further, in some cases, Bidirectional Scattering Surface Reflectance Distribution Function (BSSRDF) may be used. The data amount increases as the dimension increases.

Examples of a measurement method of reflection characteristics include a method of imaging an object a plurality of times while changing directions of a light source and an imaging device to measure the reflection characteristics of the object using a parametric reflection characteristic model. Examples of a specular reflection light model include Torrance-Sparrow model. Further, examples of the specular reflection light models include Cook-Torrance model and Phong model. Examples of a diffuse reflection light model include Lambert model and Oren-Nayar model. Using these parametric reflection characteristic models enables expressing the reflection characteristics of the object surface with parameters.

In the present exemplary embodiment, among the reflection characteristics of the object surface converted into parameters, information about the specular reflection light component 107 is referred to as specular reflection information, and information about the diffuse reflection light component 108 is referred to as diffuse reflection information. Further, information about the normal line 104 is referred to as normal information, information about the specular reflection intensity 110 is referred to as reflection intensity information, and information about the spread width 111 is referred to as spread width information. Further, in the present exemplary embodiment, information including the reflection intensity information, the spread width information, and the normal information is referred to as specular reflection information.

For example, a case where the diffuse reflection light on the object surface is converted into parameters using Lambert model will be described. The radiance $L_{Lambert}$ of the diffuse reflection light is given by formula (1) using Lambert model.

$$L_{Lambert} = K_d \cos\theta_i \quad (1)$$

In the formula (1), $\theta_i$ is an incident angle, and $K_d$ is a diffuse reflectance. In the case where the diffuse reflection light is modeled using Lambert model, the two-dimensional distribution $K_d(x, y)$ of the diffuse reflectance $K_d$ corresponds to the diffuse reflection information in the present exemplary embodiment.

A case where the specular reflection light on the object surface is converted into parameters using Torrance-Sparrow model will be described. The radiance $L_{TS}$ of the specular reflection light is given by formula (2) using Torrance-Sparrow model.

$$L_{TS} = K_s \frac{DGF}{\cos\theta_0} \quad (2)$$

In the formula (2), $\theta_0$ is a reflection angle and $K_s$ is a specular reflectance. Further, D is a normal distribution term, G is a geometric attenuation term, and F is a Fresnel term. The normal distribution term D, which represents variation of normal lines on the object surface, indicates a probability density function of an angle $\alpha$ formed by a normal direction N and a direction H (i.e., half vector), which is a bisector direction of an illumination direction and an observation direction. The normal distribution term D is given by formula (3).

$$D = e^{-(\alpha n)^2} \quad (3)$$

In the formula (3), n is a parameter representing roughness of a surface. Further, a geometric attenuation term G, which represents self-shielding and self-shading caused by roughness of a minute surface, decreases as the illumination direction or the observation direction approaches the tangent plane of the object. The geometric attenuation term G is given by formula (4).

$$G = \min\left(1, \frac{2(N \cdot H)(H \cdot V)}{(V \cdot H)}, \frac{2(N \cdot H)(H \cdot L)}{(V \cdot H)}\right) \quad (4)$$

In the formula (4), V is an observation direction, L is an illumination direction. Further, the Fresnel term F, which changes in reflectance depending on the refraction index or incident angle, is given by formulas (5), (6), and (7).

$$F = \frac{1}{2} \frac{(g-c)^2}{(g+c)^2}\left(1 + \frac{(c(g+c)-1)^2}{(c(g-c)+1)^2}\right) \quad (5)$$

$$c = V \cdot H \quad (6)$$

$$g = \sqrt{\eta^2 + c^2 - 1} \quad (7)$$

In the formula (7), $\eta$ is a relative refractive index. In the case where the specular reflection light is modeled using Torrance-Sparrow model, the two-dimensional distribution N(x, y) in the normal direction N corresponds to the normal information in the present exemplary embodiment. Further, the two-dimensional distribution Ks(x, y) of the specular reflectance Ks corresponds to the reflection intensity information in the present exemplary embodiment, and the two-dimensional distribution n(x, y) of n, which is a parameter indicating the roughness of the surface, corresponds to the spread width information in the present exemplary embodiment.

<Hardware Configuration of Information Processing Apparatus>

FIG. 2 is a block diagram illustrating a hardware configuration of an information processing apparatus 1. The information processing apparatus 1 includes a central processing unit (CPU) 201, a read-only memory (ROM) 202, and a random-access memory (RAM) 203. Further, the information processing apparatus 1 includes a video card (VC) 204, a general-purpose interface (I/F) 205, a Serial Advanced Technology Attachment (SATA) I/F 206, and a network interface card (NIC) 207. The CPU 201 executes an operating system (OS) and various programs stored in the ROM 202 or a hard disk drive (HDD) 213 using the RAM 203 as a work memory. Further, the CPU 201 controls each component via a system bus 208. The processing performed according to flowcharts described below is executed by the CPU 201 loading into the RAM 203 a program code stored in the ROM 202 or the HDD 213 and executing the program code. A display device 215 is connected to the VC 204. An input device 210, such as a mouse and a keyboard, and an imaging device 211 are connected to the general-purpose I/F 205 via a serial bus 209. A general-purpose drive 214 is connected to the SATA I/F 206 via a serial bus 212. The general-purpose drive 214 reads and writes information from and into the HDD 213 and various kinds of recording media. The NIC 207 receives and outputs information from and to an external apparatus. The CPU 201 uses, as a storage location of various kinds of data, the HDD 213 or various kinds of recording media mounted on the general-purpose drive 214. The CPU 201 displays a user interface (UI) provided by the program on the display device 215, and receives user instructions given via the input device 210. The display device 215 may be a touch panel display having a touch panel function that can detect a touched position with an instruction tool such as a finger.

<Functional Configuration of Information Processing Apparatus>

Figure 3:
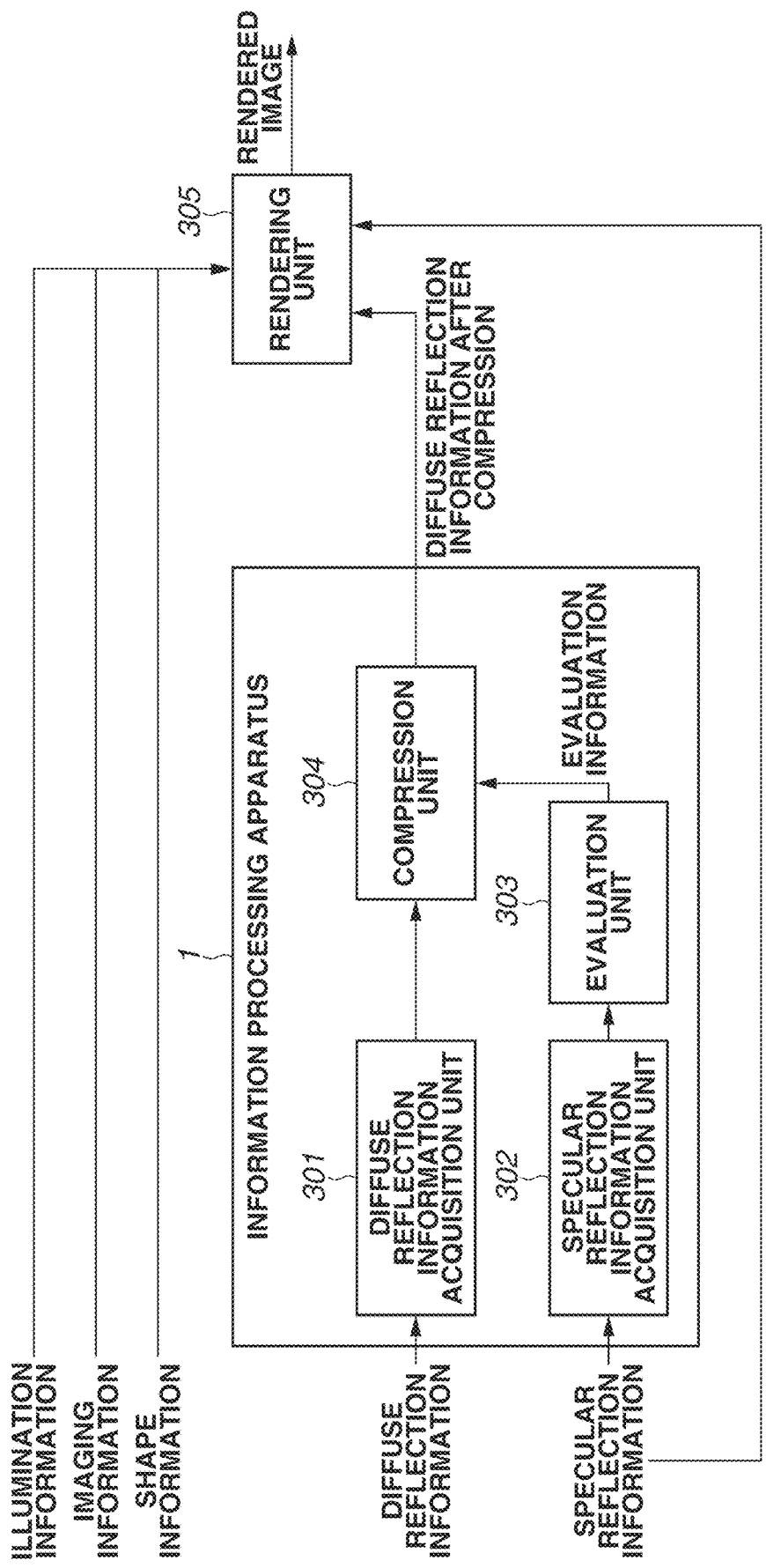
FIG. 3 is a block diagram illustrating a functional configuration of the information processing apparatus.

FIG. 3 is a block diagram illustrating a functional configuration of the information processing apparatus 1. The CPU 201 functions as the functional configuration illustrated in FIG. 3 by reading a program stored in the ROM 202 or the HDD 213 and executing the read program using the RAM 203 as a work memory. However, all the processing described below is not necessarily to be executed by the CPU 201, and the information processing apparatus 1 may be configured to execute a part of or all of the processing by one or more circuits other than the CPU 201.

The information processing apparatus 1 includes a diffuse reflection information acquisition unit 301, a specular reflection information acquisition unit 302, an evaluation unit 303, and a compression unit 304. The diffuse reflection information acquisition unit 301 acquires diffuse reflection information from a storage device such as the HDD 213. The specular reflection information acquisition unit 302 acquires specular reflection information from a storage device such as the HDD 213. Based on the specular reflection information, the evaluation unit 303 derives evaluation information, which is an evaluation result of the specular reflection information. The compression unit 304 compresses the diffuse reflection information based on the evaluation information.

Further, the compression unit 304 outputs the diffuse reflection information obtained through the compression processing to a rendering unit 305. The rendering unit 305 acquires the compressed diffuse reflection information, the specular reflection information, illumination information, imaging information, and shape information, and performs rendering based on the acquired information to generate an image with texture of the object 101 reproduced. The rendering unit 305 in the present exemplary embodiment is not included in the information processing apparatus 1, but may be included in the information processing apparatus 1. Further, the compression unit 304 outputs the compressed diffuse reflection information to the rendering unit 305, but the output destination may be another device such as the HDD 213. Further, the diffuse reflection information acquisition unit 301 and the specular reflection information acquisition unit 302 acquire information from the HDD 213, but may acquire information from another device such as the imaging device 211.

<Processing Procedure Performed by Information Processing Apparatus>

Figure 4:
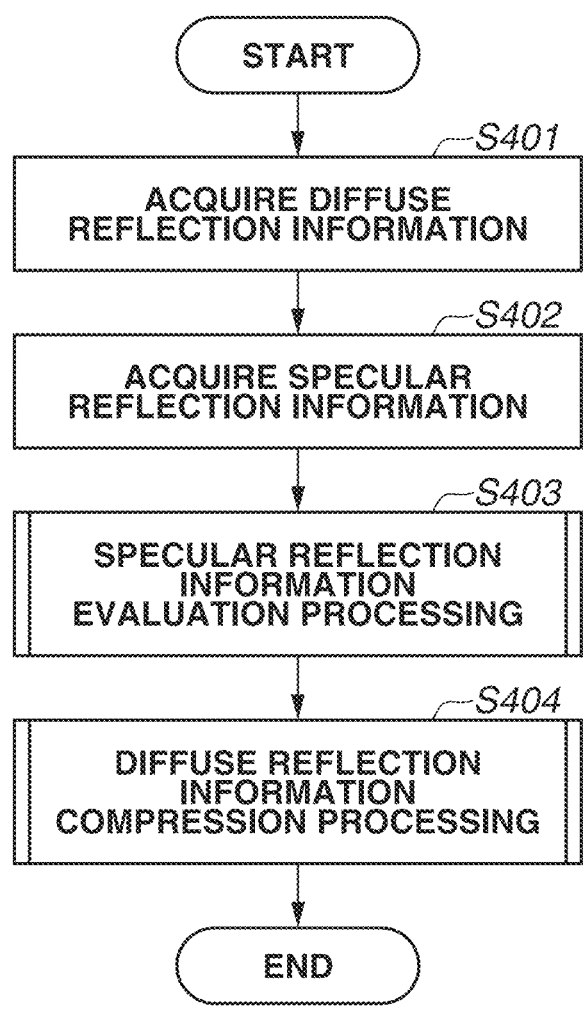
FIG. 4 is a flowchart illustrating processing executed by the information processing apparatus.

The processing procedure performed by the information processing apparatus 1 according the present exemplary embodiment will be described with reference to a flowchart illustrated in FIG. 4. The processing illustrated in the flowchart in FIG. 4 is started when a user inputs an instruction via the input device 210 and the CPU 201 accepts the instruction.

In step S401, the diffuse reflection information acquisition unit 301 reads diffuse reflection information from the HDD 213. The diffuse reflection information according to the present exemplary embodiment is information about diffuse reflection light on a surface of object surfaces, and is information in an image format with a size of 128×128 pixels, a resolution of 150 dots per inch (dpi), and a pixel-value (R, G, B) expressed in 8 bits. In step S402, the specular reflection information acquisition unit 302 reads specular reflection information from the HDD 213. The specular reflection information acquisition unit 302 according to the present exemplary embodiment acquires normal information which is a factor in specifying a specular reflection direction. The normal information according to the present exemplary embodiment is information about the normal direction on a surface of the object surfaces, and is information in an image format with a size of 128×128 pixels, a resolution of 150 dpi, and a pixel-value (X, Y, Z) expressed in 8 bits. The pixel-value (X, Y, Z) of the normal information expresses XYZ components of a normal vector. An example of the normal information is illustrated in FIG. 5. Images illustrated in FIG. 5 include, in a case where the normal information includes red, green, and blue (RGB) images, an image 501 expressing an X component corresponding to an R signal, an image 502 expressing a Y component corresponding to a G signal, and an image 503 expressing a Z component corresponding to a B signal.

In step S403, the evaluation unit 303 evaluates specular reflection light on the object surface based on the specular reflection information. The evaluation unit 303 according to the present exemplary embodiment evaluates variation in the normal information included in the specular reflection information.

Figure 6A:
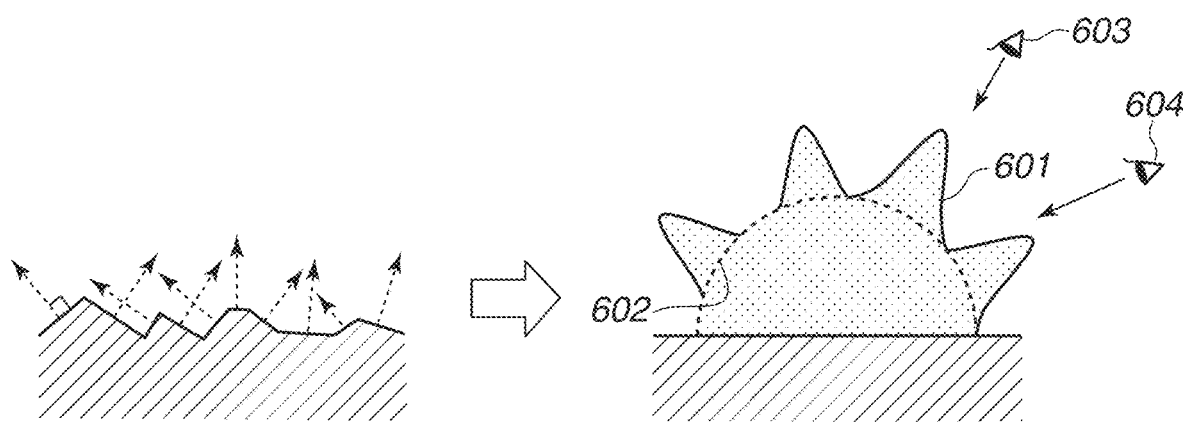
FIGS. 6A and 6B are schematic diagrams illustrating visual state change depending on normal directions.
Figure 6B:
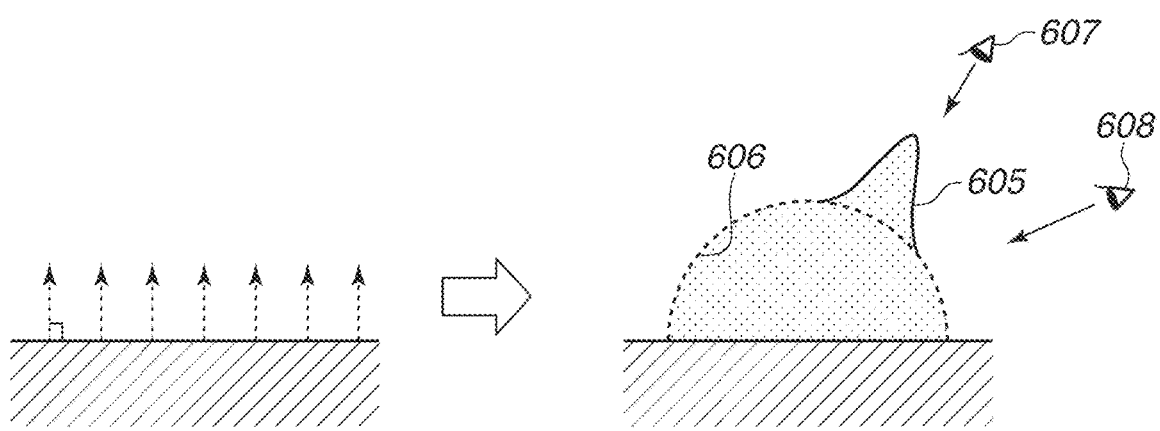

A benefit of compressing the diffuse reflection information based on the normal information of the object surface will be described with reference to FIGS. 6A and 6B. FIGS. 6A and 6B each schematically illustrate a surface shape in a region of the object surface and reflection characteristics of the region including a reflection characteristic at each point. FIG. 6A schematically illustrates the reflection characteristics in a case where normal directions vary on the object surface. Since the specular reflection direction changes depending on the normal direction of the object surface, if the normal directions on the object surface vary, the observed reflection characteristics include a plurality of peaks in reflection intensity. Assume that a surface having reflection characteristics including a specular reflection light component 601 and a diffuse reflection light component 602 is observed from various directions including an observation position 603 and an observation position 604. In this case, since the intensity of the specular reflection light component 601 significantly changes depending on the observation direction, an observer perceives glittering high brightness but can hardly perceive deterioration of the diffuse reflection light component 602 caused by compression.

FIG. 6B schematically illustrates reflection characteristics in a case where normal directions are substantially uniform on the object surface. Assume that a surface having reflection characteristics including a specular reflection light component 605 and a diffuse reflection light component 606 is observed from an observation position 607 and an observation position 608. The observation position 607 is a position to observe the object surface from a reflection intensity peak direction of the specular reflection light component 605, and the observation position 608 is a position to observe the object surface from a direction shifted from the reflection intensity peak direction of the specular reflection light component 605. In the case where the object surface is observed from the observation position 608, since the specular reflection light component 605 is small, the observer can easily perceive deterioration of the diffuse reflection light component 606 caused by compression.

As described above, in the case where the diffuse reflection information is compressed, the image quality deterioration at a texture reproduction time can be hardly perceived on the surface where the normal directions vary, and the image quality deterioration at a texture reproduction time can be easily perceived on the surface where the normal directions are uniform. Thus, the evaluation unit 303 according to the present exemplary embodiment evaluates the variation of the normal directions by deriving the similarities between the normal direction of the target pixel and the normal directions of adjacent pixels based on the normal information acquired in step S402, and then outputs the generated evaluation information to the compression unit 304. The compression unit 304 performs, based on the evaluation information, high compression processing on the diffuse reflection information in a case where the variation of the normal directions is large, and low compression processing on the diffuse reflection information in a case where the variation of the normal directions is small.

Figure 8:
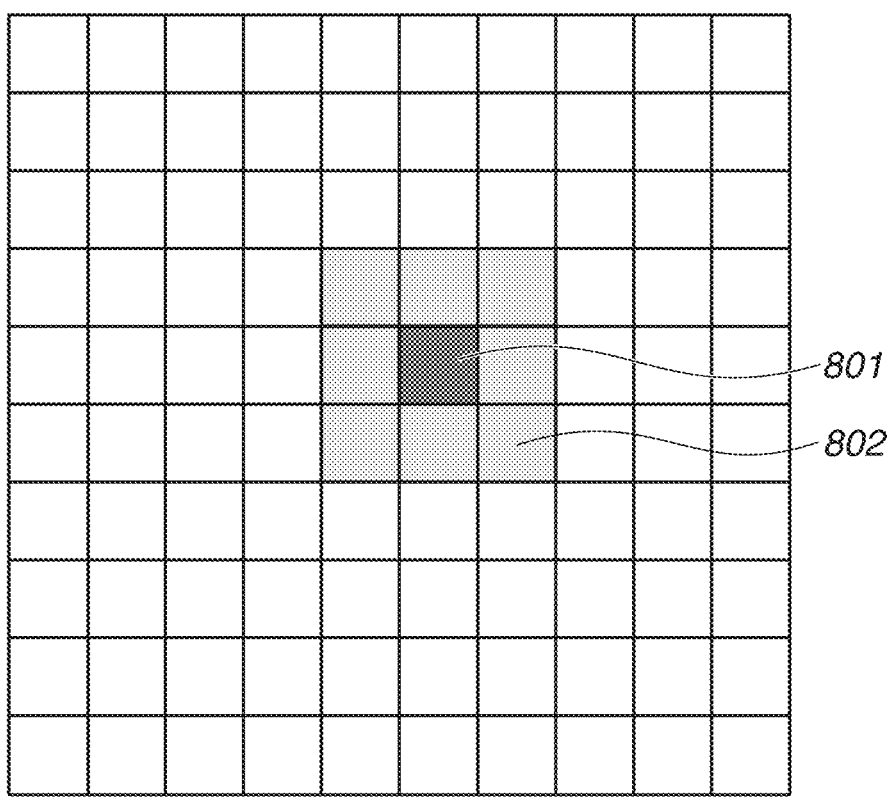
FIG. 8 is a schematic diagram illustrating the processing of evaluating the specular reflection information.

Referring back to step S403, details of processing for evaluating the normal information will be described with reference to a flowchart in FIG. 7. In step S701, the evaluation unit 303 starts repetition processing on the normal information N(x, y) for all the pixels. More specifically, the evaluation unit 303 performs processing in steps S702 to S704 while sequentially changing a target pixel. In step S702, the evaluation unit 303 starts repetition processing on an adjacent pixel of the target pixel. FIG. 8 is a schematic diagram illustrating a target pixel and adjacent pixels. In the present exemplary embodiment, 8 pixels located on the upper left, upper, upper right, left, right, lower left, lower, and lower right sides of a target pixel 801 are set as adjacent pixels 802. Four adjacent pixels located on the upper, left, right, and lower sides of the target pixel 801 may be set as the adjacent pixels 802. Further, from among the pixels included in a region of 5×5 pixels around the target pixel 801, pixels excluding the target pixel 801 may be set as the adjacent pixels 802.

In step S703, the evaluation unit 303 derives a similarity between the normal direction of the target pixel 801 and the normal direction of one adjacent pixel 802. The evaluation unit 303 according to the present exemplary embodiment derives a cosine similarity as a similarity of two directions. The cosine similarity cs is given by a formula 8.

$$cs = \frac{N_n \cdot N_a}{|N_n| \cdot |N_a|} \quad (8)$$

In the formula (8), $N_n$ is a normal direction of an adjacent pixel, and $N_a$ is a normal direction of a target pixel. In a case where a normal direction of an adjacent pixel and a normal direction of a target pixel is the same, cs=1, and as difference of directions becomes larger, cs becomes smaller. In a case where a normal direction of an adjacent pixel and a normal direction of a target pixel are opposite, cs=−1.

In step S704, the evaluation unit 303 returns the processing to step S702 until the processing on all the adjacent pixels with respect to the set target pixel is completed. In step S705, the evaluation unit 303 returns the processing to step S701 until the similarities in normal directions for all the pixels with respect to the adjacent pixels are derived. After the processing on all the pixels is completed, the evaluation unit 308 generates evaluation information including similarities in normal directions for each pixel, and outputs the evaluation information to the compression unit 304.

Figure 9:
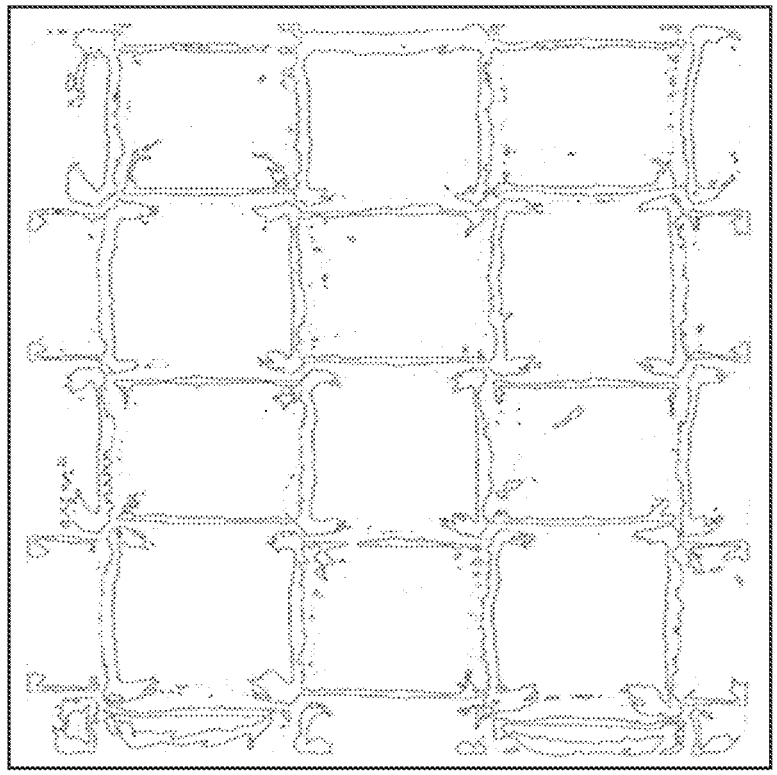
FIG. 9 is a schematic diagram illustrating evaluation information.

An example of the valuation information generated in step S403 is illustrated FIG. 9. The evaluation information generated in the present exemplary embodiment is information in gray scale image format with a size of 128×128 pixels, a resolution of 150 dpi, and a pixel value expressed in 8 bits. Cosine similarities between −1 to 1 correspond to pixel values from 0 to 255, and the pixel value 0 corresponds to black and the pixel value 255 corresponds to white. In addition, the evaluation information may not necessarily be stored in an image format, and may be stored, for example, in a comma separated value (CSV) file.

In step S404, the compression unit 304 compresses the diffuse reflection information based on the evaluation information.

Figure 10:
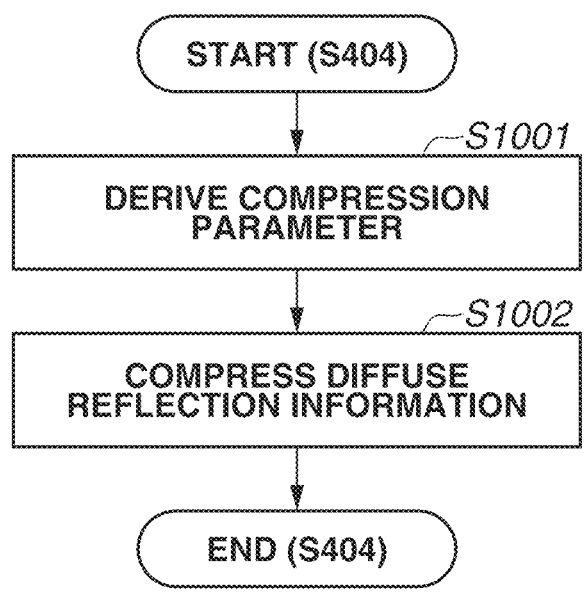
FIG. 10 is a flowchart illustrating processing of compressing diffuse reflection information.
Figure 11:
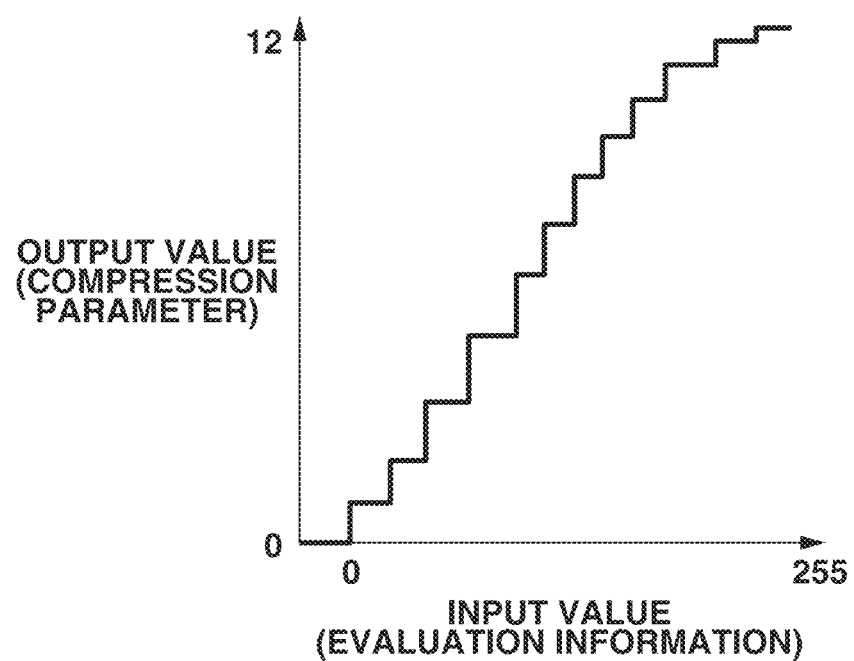
FIG. 11 is a schematic diagram illustrating processing of determining compression parameters.

The compression method used in the present exemplary embodiment is a known Joint Photographic Experts Group (JPEG) compression method. Details of the compression processing of the diffuse reflection information performed in step S404 will be described with reference to a flowchart in FIG. 10. In step S1001, the compression unit 304 determines a compression parameter of a scalar value based on the evaluation information. The compression parameter in the present exemplary embodiment is a compression rate by the JPEG compression method. The compression rate by the JPEG compression method is expressed in integer values from 12, which indicates a lowest compression rate, to 0, which indicates a highest compression rate. As the value of the compression rate is smaller, the file size after compression is smaller, and as the value of the compression rate is larger, the file size after compression is larger. The compression unit 304 derives an average value of the evaluation information as a representative value of the evaluation information. Further, the compression unit 304 converts the derived average value into a compression parameter with reference to a look-up table (LUT). The LUT is generated in advance and stored in a storage device such as the HDD 213. An example of the LUT is illustrated in FIG. 11. The LUT is information indicating a correspondence relationship between the average value of the evaluation information and the compression parameter.

In step S1002, the compression unit 304 compresses the diffuse reflection information using the compression parameter determined in step S1001. The compression unit 304 uses the known JPEG compression method for compression processing. The compression unit 304 according to the present exemplary embodiment uses the JPEG compression method for compressing the diffuse reflection information. However, it is not limited thereto, and the compression unit 304 may use a method of reducing bit-depth of the diffuse reflection information, a method of reducing the number of pixels of the diffuse reflection information, and a JPEG 2000 compression method. Then, the compression unit 304 outputs the compressed diffuse reflection information to the rendering unit 305.

<Effect of First Exemplary Embodiment>

Figure 12A:
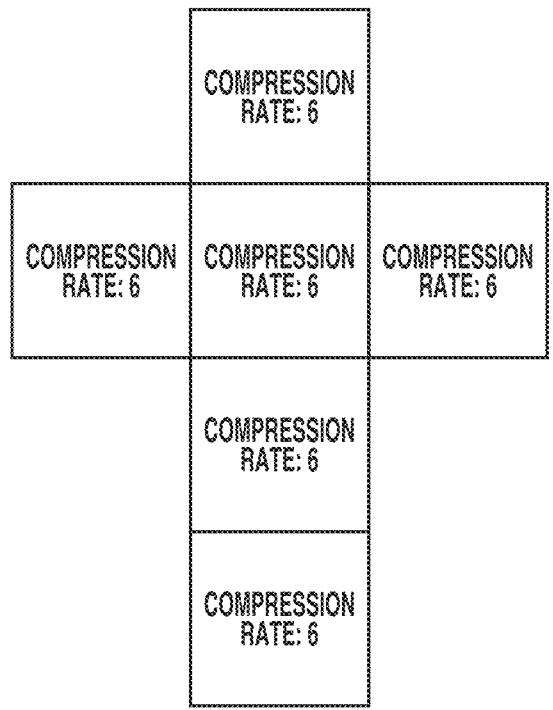
FIGS. 12A and 12B are schematic diagrams illustrating an effect.
Figure 12B:
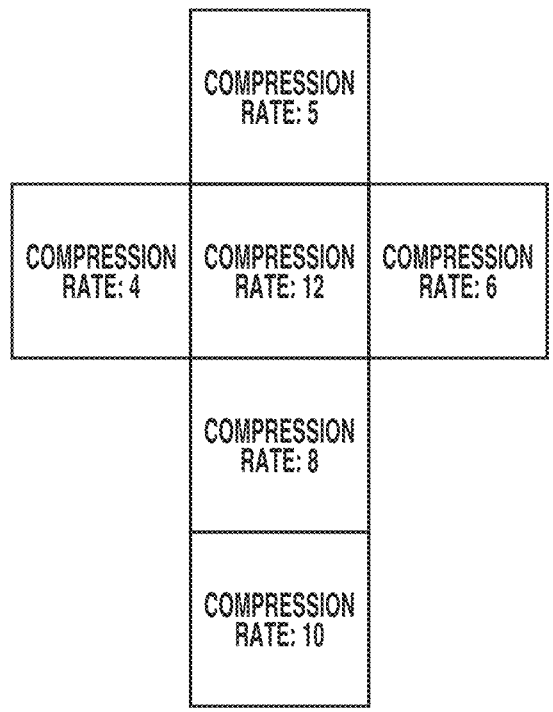

As described above, the information processing apparatus 1 according to the present exemplary embodiment acquires the specular reflection information about the specular reflection light on the object, acquires the diffuse reflection information about the diffuse reflection light on the object, and compresses the diffuse reflection information based on the specular reflection information. FIGS. 12A and 12B are schematic diagrams illustrating an effect of the present exemplary embodiment. FIG. 12A illustrates compression rates of the diffuse reflection information in a case where the JPEG compression method is simply performed on each surface of the object 101 illustrated in FIG. 1B. FIG. 12B illustrates compression rates of the diffuse reflection information in a case where the compression processing according to the present exemplary embodiment is performed on each surface of the object 101 illustrated in FIG. 1B. In the case where the JPEG compression method is simply performed, all the surfaces of the object 101 have a same compression rate irrespective of the surfaces. However, in the case where the compression processing according to the present exemplary embodiment is performed, since the compression rates are respectively determined based on the normal information of the surfaces of the object 101, the compression rates differ depending on the surfaces. In this way, in the case where the variation of the normal directions is large, high compression processing is performed on the diffuse reflection information, and in the case where the variation of the normal directions is small, low compression processing is performed on the diffuse reflection information. Thus, data is largely compressed to reduce the data amount in the case where the deterioration of texture can hardly be perceived compared to the case where the deterioration of texture can easily be perceived. Accordingly, it is possible to reduce the deterioration of the texture of the object expressed using the reflection characteristic data, and also reduce the data amount of the reflection characteristic data.

Modification Example

Figure 13:
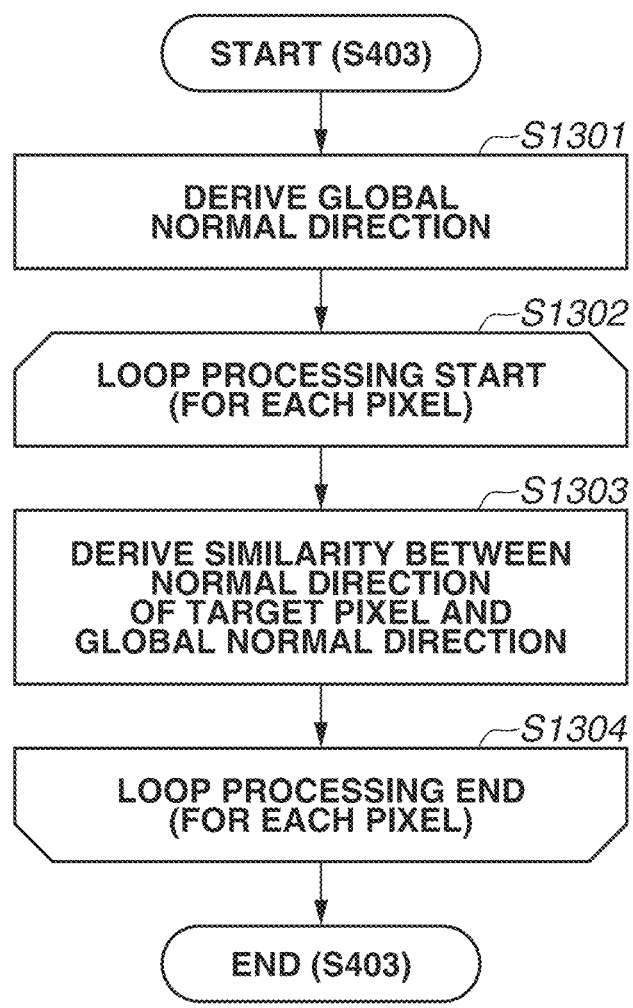
FIG. 13 is a flowchart illustrating processing of evaluating specular reflection information.

In the present exemplary embodiment, the normal information is evaluated by deriving the similarities between the normal direction of the target pixel and the normal directions of the adjacent pixels. However, the evaluation method of the normal information is not limited thereto. For example, the variation in the normal information may be evaluated by deriving the similarity between a normal direction of each target pixel and a global normal direction. A processing procedure of evaluating the normal information will be described with reference to FIG. 13. In step S1301, the evaluation unit 303 derives a global normal direction. In this case, the global normal direction is an average value of normal directions N of the normal information N(x, y) in all the pixels. In step S1302, the evaluation unit 303 starts repetition processing of the normal information N(x, y) on all the pixels. More specifically, the processing in step S1303 is performed while changing the target pixel sequentially.

In step S1303, the evaluation unit 303 derives a similarity between the normal direction of the target pixel and the global normal direction derived in step S1301. The evaluation unit 303 derives a cosine similarity as the similarity in normal directions. In step S1304, the evaluation unit 303 returns the processing to step S1302 until the similarity in normal directions is derived for each of all the pixels. Through the processing described above, the variation in the normal information can be evaluated by deriving the similarity between each of the normal directions of the target pixel and the global normal direction.

Further, as a method of setting a compression rate different for each region of the diffuse reflection information, a region of interest (ROI) may be set in the diffuse reflection information. Alternatively, the ROI may be set based on the specular reflection information.

Now, a second exemplary embodiment will be described. In the first exemplary embodiment, the diffuse reflection information is compressed based on the normal information included in the specular reflection information. In the present exemplary embodiment, the diffuse reflection information is compressed based on at least one of the reflection intensity information and the spread width information included in the specular reflection information. The hardware configuration and the functional configuration of the information processing apparatus 1 in the present exemplary embodiment are similar to those in the first exemplary embodiment, and the descriptions thereof are omitted. Hereinbelow, portions different between the present exemplary embodiment and the first exemplary embodiment will be mainly described. The same components as those in the first exemplary embodiment are described with the same numerals assigned.

<Processing Procedure Performed by Information Processing Apparatus>

The processing procedure performed by the information processing apparatus 1 in the present exemplary embodiment will be described with reference to the flowchart illustrated in FIG. 4. The processing in step S401 is similar to that in the first exemplary embodiment, and thus the description thereof is omitted. In step S402, the specular reflection information acquisition unit 302 reads specular reflection information from the HDD 213. The specular reflection information acquisition unit 302 according to the present exemplary embodiment acquires reflection intensity information and spread width information. However, the specular reflection information acquisition unit 302 may not acquire both of the reflection intensity information and the spread width information if the specular reflection information acquisition unit 302 can acquire at least one of the reflection intensity information and the spread width information. In step S403, the evaluation unit 303 evaluates specular reflection light on the object surface.

Figure 14A:
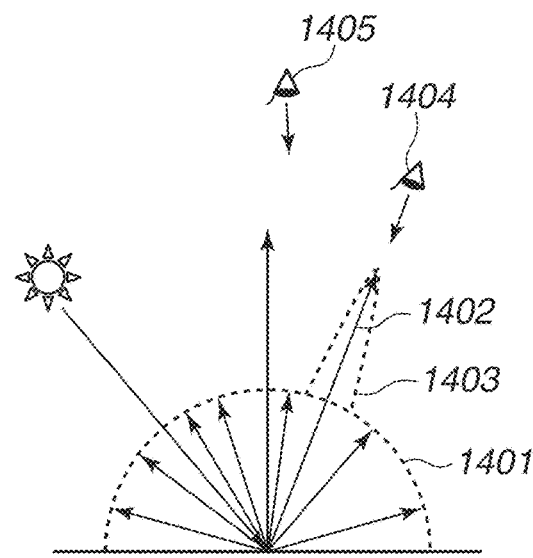
FIGS. 14A, 14B, and 14C are schematic diagrams illustrating visual state change of diffuse reflection components depending on specular reflection components.
Figure 14B:
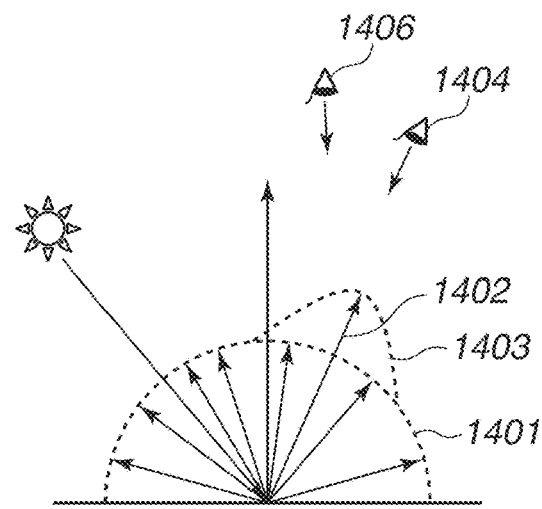
Figure 14C:
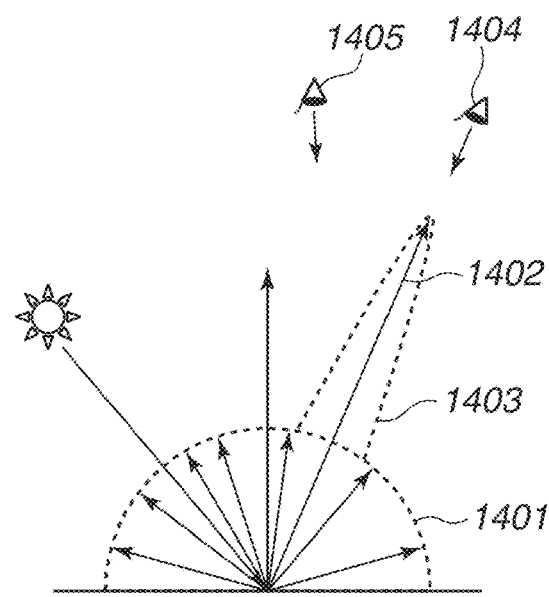

A benefit of compressing the diffuse reflection information based on the specular reflection information on the object surface will be described with reference to FIGS. 14A, 14B, and 14C. FIGS. 14A, 14B, and 14C are diagrams schematically illustrating cases where diffuse reflection light components 1401 are the same, but specular reflection intensities 1402 and spread widths 1403 are respectively different. FIG. 14B illustrates a case where the spread width 1403 is larger than that in FIG. 14A. FIG. 14C illustrates a case where the specular reflection intensity 1402 is larger than that in FIG. 14A.

In each of FIGS. 14A, 14B, and 14C, an observation position 1404 is an observation position to observe reflection light from a peak direction of the reflection intensity of the specular reflection light component, and an observation position 1405 and an observation position 1406 are observation positions to observe the reflection light from directions shifted from the peak direction of the reflection intensity of the specular reflection light component. In a case where the reflection light is observed from the observation position 1404, the specular reflection light component is observed in addition to the diffuse reflection light component 1401. In a case where the reflection light is observed from the observation position 1405, in one embodiment, only the diffuse reflection light component 1401 is observed. Further, in a case where the reflection light is observed from the observation position 1406, the specular reflection light component is observed in addition to the diffuse reflection light component 1401. In the observations from the observation position 1404 and the observation position 1406, since the specular reflection light component is observed, deterioration of the diffuse reflection light component 1401 caused by the compression is not easily perceived.

As described above, in the case where the diffuse reflection information is compressed, the image quality deterioration generated when texture is reproduced is not easily perceived on a surface with a large specular reflection intensity and a large spread width of the specular reflection light component. Thus, the evaluation unit 303 according to the present exemplary embodiment evaluates the specular reflection light based on the reflection intensity information and the spread width information acquired in step S402, and outputs the generated evaluation information to the compression unit 304.

Figure 15:
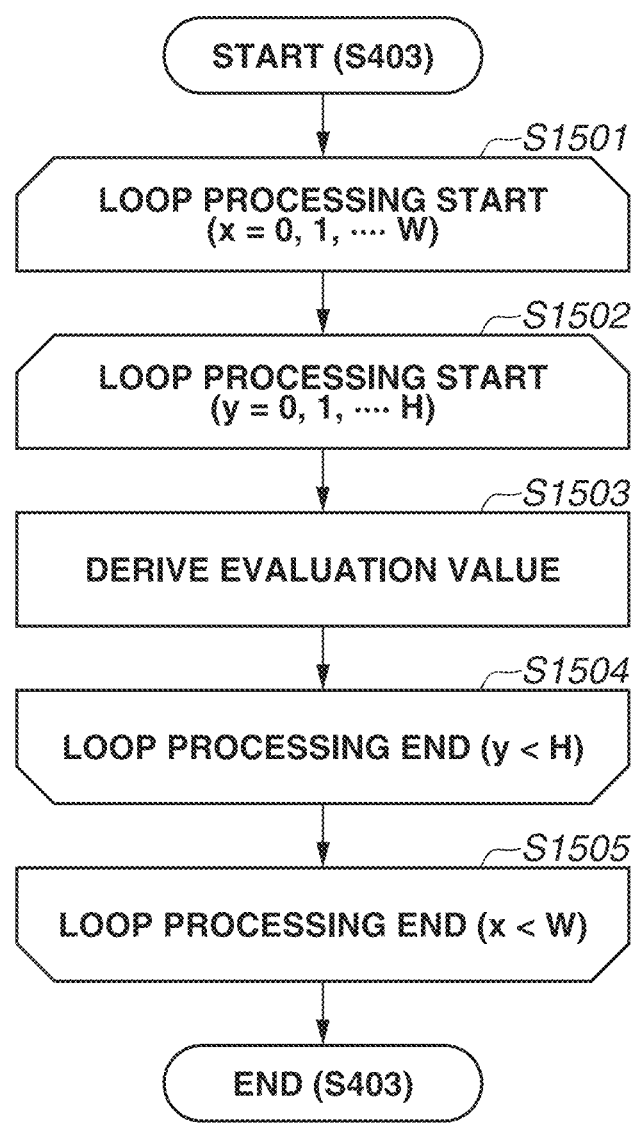
FIG. 15 is a flowchart illustrating processing of evaluating specular reflection information.

Referring back to step S403, details of processing of evaluating the reflection intensity information and the spread width information performed in step S403 will be described with reference to a flowchart illustrated in FIG. 15. In step S1501, the evaluation unit 303 acquires the number of data W of the specular reflection information in the horizontal direction (x direction) and sets "0" to "x" that indicates the current reference position in the horizontal direction. In step S1502, the evaluation unit 303 acquires the number of data H of the specular reflection information in the vertical direction (y direction), and sets "0" to "y" that indicates the current reference position in the vertical direction. In step S1503, the evaluation unit 303 derives an evaluation value based on the specular reflection information at a position (x, y) with the upper left position of the specular reflection information as an origin. More specifically, the evaluation unit 303 derives an evaluation value that reduces a compression rate of the diffuse reflection information in a case where the specular reflection intensity is large, and that increases a compression rate of the diffuse reflection information in a case where the specular reflection intensity is small. Further, the evaluation unit 303 derives an evaluation value that reduces a compression rate of the diffuse reflection information in a case where the spread width of the specular reflection light is large, and that increases a compression rate of the diffuse reflection information in a case where the spread width of the specular reflection light is small.

In step S1504, the evaluation unit 303 determines whether "y" is smaller than the number of data "H" in the vertical direction. In a case where "y" is smaller than "H", the processing returns to step S1502, and in a case where "y" is equal to "H", the processing proceeds to step S1505. In step S1505, the evaluation unit 303 determines whether "x" is smaller than the number of data "W" in the horizontal direction. In a case where "x" is smaller than "W", the processing returns to step S1501, and in a case where "x" is equal to "W", the evaluation unit 303 generates evaluation information including an evaluation value of the specular reflection light for each pixel, and outputs the evaluation information to the compression unit 304. The processing in step S404 is similar to that in the first exemplary embodiment, and thus the description thereof is omitted.

<Effect of Second Exemplary Embodiment>

As described above, the information processing apparatus 1 according to the present exemplary embodiment compresses the diffuse reflection information based on at least one of the reflection intensity information and the spread width information included in the specular reflection information. In this way, the data amount of the reflection characteristic data can be reduced while the deterioration of texture of the object expressed using the reflection characteristic data is reduced.

Modification Example

In the present exemplary embodiment, the diffuse reflection information is compressed based on both of the reflection intensity information and the spread width information. However, in one embodiment, the diffuse reflection information may be compressed based on only the reflection intensity information or based on only the spread width information. Alternatively, the diffuse reflection information may be compressed with reference to the normal information used in the first exemplary embodiment, in addition to the reflection intensity information or the spread width information.

A third exemplary embodiment will be described. In the exemplary embodiments described above, the specular reflection information is evaluated for each pixel, and the diffuse reflection information is compressed based on the evaluation result. In a case where an object has a complicated shape, a region having a certain size is sometimes necessary to evaluate the specular reflection light correctly. For this reason, in the present exemplary embodiment, the specular reflection information is divided into a plurality of regions, the specular reflection information is evaluated for each divided region, and the diffuse reflection information is compressed based on the evaluation result. The hardware configuration of the information processing apparatus 1 according to the present exemplary embodiment is similar to that according to the first exemplary embodiment, and thus the description thereof is omitted. Hereinbelow, portions in the present exemplary embodiment different from those in the first exemplary embodiment will be mainly described. The same components as those in the first exemplary embodiment are described with the same numerals assigned.

<Functional Configuration of Information Processing Apparatus>

Figure 16:
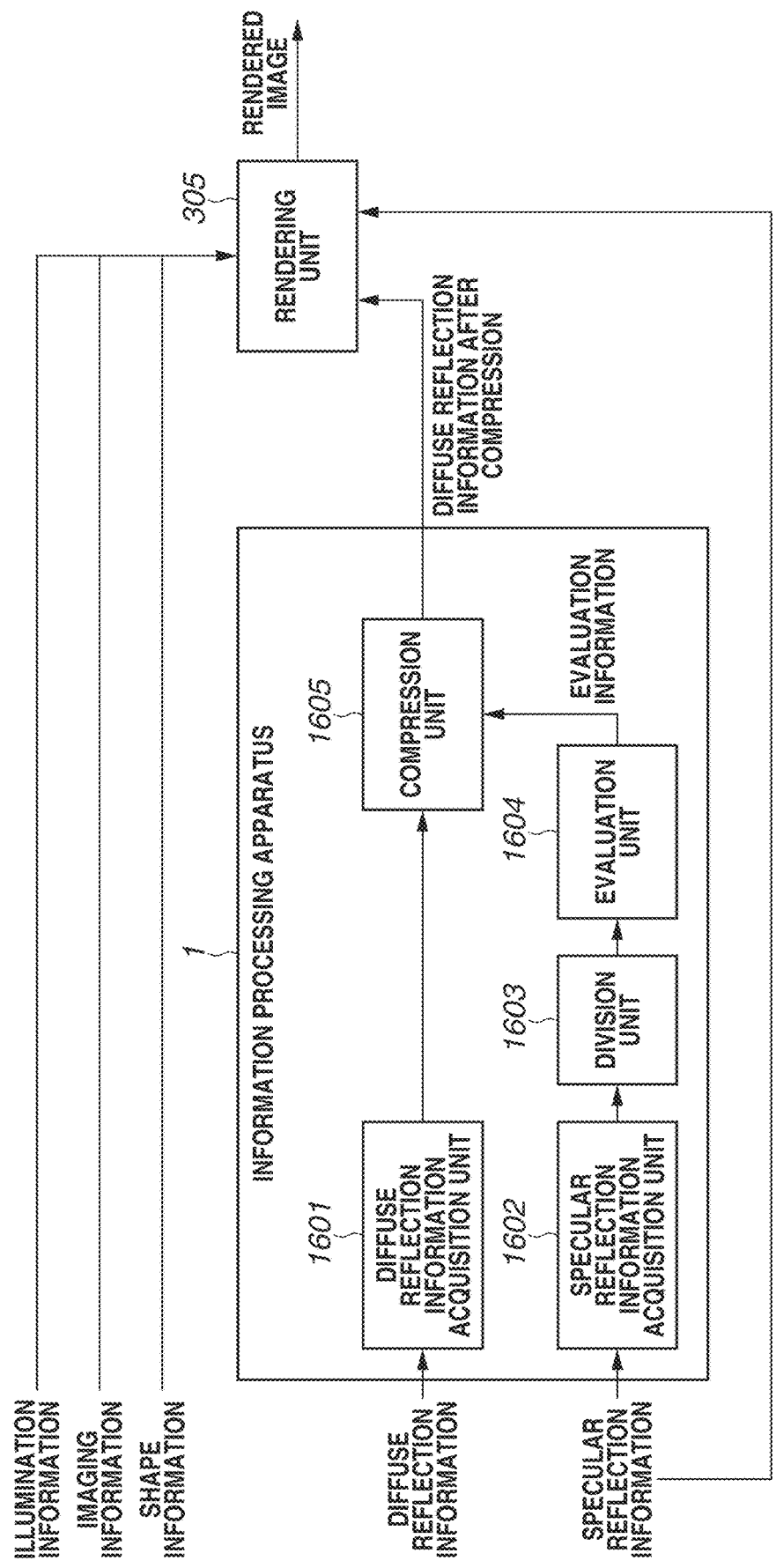
FIG. 16 is a block diagram illustrating a functional configuration of an information processing apparatus.

FIG. 16 is a block diagram illustrating a functional configuration of the information processing apparatus 1. The CPU 201 functions as the functional configuration illustrated in FIG. 16 by reading a program stored in the ROM 202 or the HDD 213 and executing the read program using the RAM 203 as a work memory. However, not all the processing described below is necessary to be executed by the CPU 201, and the information processing apparatus 1 may be configured to execute a part of or all of the processing described below by one or more circuits other than the CPU 201

The information processing apparatus 1 includes a diffuse reflection information acquisition unit 1601, a specular reflection information acquisition unit 1602, a division unit 1603, an evaluation unit 1604, and a compression unit 1605. The diffuse reflection information acquisition unit 1601 acquires diffuse reflection information from a storage device such as the HDD 213. The specular reflection information acquisition unit 1602 acquires specular reflection information from a storage device such as the HDD 213. The division unit 1603 divides the specular reflection information into a plurality of regions each including a predetermined number of pixels or more. The evaluation unit 1604 derives evaluation information, which is an evaluation result of the specular reflection information, for each region based on the specular reflection information. The compression unit 1605 compresses the diffuse reflection information for each region, based on the evaluation information.

<Processing Procedure Performed by Information Processing Apparatus>

Figure 17:
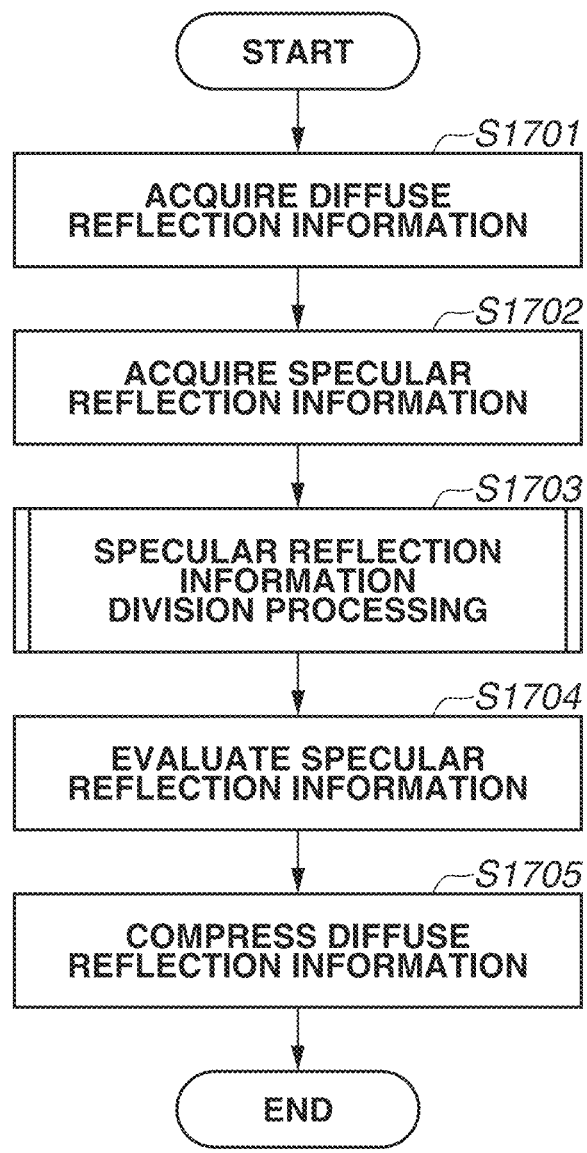
FIG. 17 is a flowchart illustrating processing executed by the information processing apparatus.

The processing procedure performed by the information processing apparatus 1 according to the present exemplary embodiment will be described with reference to a flowchart illustrated in FIG. 17. The processing illustrated in the flowchart in FIG. 17 is started when a user inputs an instruction via the input device 210 and the CPU 201 accepts the input instruction.

In step S1701, the diffuse reflection information acquisition unit 1601 reads diffuse reflection information from the HDD 213. The diffuse reflection information in the above-described exemplary embodiments is information about the diffuse reflection light on a surface of the object surfaces, but the diffuse reflection information in the present exemplary embodiment is information about the diffuse reflection light on all the surfaces of the object. The surfaces are labeled and each surface is specified by a label. In step S1702, the specular reflection information acquisition unit 1602 reads specular reflection information from the HDD 213. The specular reflection information according to the present exemplary embodiment is information including a global normal direction in a world coordinate system for each surface. The surfaces are labeled and each surface can be specified by a label. The world coordinate system is a coordinate system for expressing a position of an object. For example, in a case where an object has a cubic shape, each surface is directed upward, downward, or other directions, and the direction in which each surface is directed is a normal direction in the world coordinate system.

Figure 18:
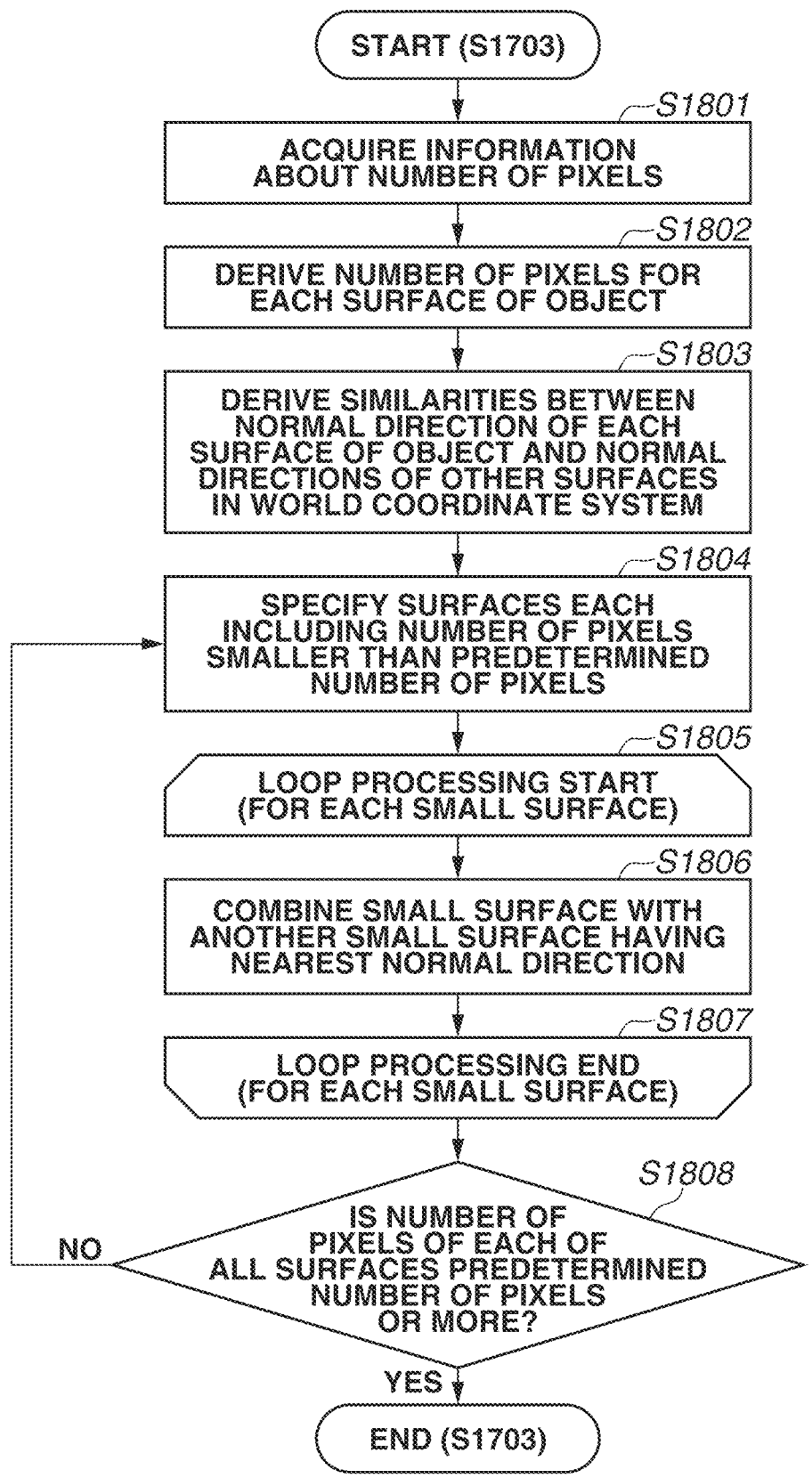
FIG. 18 is a flowchart illustrating processing of dividing specular reflection information.

In step S1703, the division unit 1603 divides the specular reflection information into a plurality of regions each including a predetermined number of pixels or more. Details of processing to divide the specular reflection information performed in step S1703 will be described with reference to a flowchart in FIG. 18. In step S1801, the division unit 1603 reads information about the number of pixels. The information about the number of pixels is the number of pixels in a region required to evaluate variation of the normal directions. In step S1802, the division unit 1603 derives the number of pixels for each surface of the object. In step S1803, the division unit 1603 derives similarities in normal directions with other surfaces in the world coordinate system, for each surface of the object. In step S1804, the division unit 1603 compares the number of pixels for each surface of the object derived in step S1802 with the information about the number of pixels read in step S1801, and specifies a label of a small surface not including the predetermined number of pixels or more.

In step S1805, the division unit 1603 starts repetition processing on small surfaces each not including the predetermined number of pixels or more. In step S1806, the division unit 1603 combines surfaces having nearest normal directions in the world coordinate system, with reference to the similarities derived in step S1803. More specifically, the division unit 1603 performs processing of replacing a label of the target surface with a label of the surface having the nearest normal direction thereto in the world coordinate system. In step S1807, the division unit 1603 returns the processing to step S1805 until the replacement processing of the labels for all the small surfaces each not including the predetermined number of pixels or more, ends. In step S1808, the division unit 1603 determines whether the number of pixels of each of all the surfaces is the predetermined number of pixels or more. In a case where the number of pixels of each of all the surfaces is the predetermined number of pixels or more (YES in step S1808), the processing in step S1703 ends. Otherwise (NO in step S1808), the processing returns to step S1804.

In step S1704, the evaluation unit 1604 derives evaluation information for each region based on the specular reflection information. The derivation method of the evaluation information is similar to that in the above-described exemplary embodiments, and thus a description thereof is omitted. In step S1705, the compression unit 1605 compresses the diffuse reflection information for each region based on the evaluation information. The method of compressing the diffuse reflection information is similar to that in the above-described exemplary embodiments, and thus a description thereof is omitted.

<Effect of Third Exemplary Embodiment>

As described above, the information processing apparatus 1 according to the present exemplary embodiment divides the specular reflection information into a plurality of regions, derives the evaluation information for each region obtained by the division, and compresses the diffuse reflection information based on the evaluation information. In this way, the data amount of the reflection characteristic data can be reduced while the deterioration of the texture of the object expressed using the reflection characteristic data is reduced. More specifically, since the specular reflection information is evaluated for each region including the predetermined number of pixels or more, the evaluation accuracy of the specular reflection information can be enhanced, and the diffuse reflection information can be efficiently compressed. Further, a region division is performed based on the normal information in the world coordinate system, so that the processing can be performed in consideration of a visual state of the rendered image seen from the same observation direction, and the diffuse reflection information can be compressed more efficiently.

Modification Example

In the present exemplary embodiment, the specular reflection information is divided into regions by combining the small surface not including the predetermined number of pixels or more with a surface having the nearest normal direction in the world coordinate system. However, the specular reflection information may be divided by other methods. The region division may be performed based on information about a material such as metal and cloth. For example, the specular reflection information is divided into regions by combining a small surface not including the predetermined number of pixels or more with a surface that can be regarded to have the same material. By dividing the specular reflection information into regions based on the material information, the diffuse reflection information can be compressed efficiently.

According to the aspect of the embodiments, the data amount of the reflection characteristic data can be reduced while the deterioration of texture of the object expressed using the reflection characteristic data is reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-063945, filed Apr. 5, 2021, which is hereby incorporated by reference herein in its entirety.

What is claimed is:
1. An apparatus comprising:
a first acquisition unit configured to acquire specular reflection information about specular reflection light on an object;
a second acquisition unit configured to acquire diffuse reflection information about diffuse reflection light on the object; and
a compression unit configured to compress the diffuse reflection information based on the specular reflection information.
2. The apparatus according to claim 1, wherein the specular reflection information includes normal information on a surface of the object.
3. The apparatus according to claim 2, wherein the compression unit compresses the diffuse reflection information based on variation of normal directions indicated by the normal information.
4. The apparatus according to claim 3, wherein the compression unit compresses the diffuse reflection information at a higher rate in a case where the variation of the normal directions is large compared to a case where the variation of the normal directions is small.
5. The apparatus according to claim 4, further comprising an evaluation unit configured to evaluate variation of the normal directions based on a similarity between a normal direction of a target pixel and a normal direction of an adjacent pixel,
wherein the compression unit compresses the diffuse reflection information based on an evaluation result by the evaluation unit.
6. The apparatus according to claim 1, wherein the specular reflection information includes a specular reflection intensity on a surface of the object.
7. The apparatus according to claim 6, wherein the compression unit compresses the diffuse reflection information at a higher rate in a case where the specular reflection intensity is large compared to a case where the specular reflection intensity is small.
8. The apparatus according to claim 1, wherein the specular reflection information includes a spread width of the specular reflection light on a surface of the object.
9. The apparatus according to claim 8, wherein the compression unit compresses the diffuse reflection information at a higher rate in a case where the spread width is large compared to a case where the spread width is small.
10. The apparatus according to claim 1, further comprising a division unit configured to divide the specular reflection information into a plurality of regions,
wherein the compression unit compresses the diffuse reflection information for each divided region.
11. A method performed by the apparatus according to claim 1, the method comprising:
acquiring specular reflection information about specular reflection light on an object;
acquiring diffuse reflection information about diffuse reflection light on the object; and
compressing the diffuse reflection information based on the specular reflection information.
12. The method according to claim 11, wherein the specular reflection information includes normal information on a surface of the object.
13. The method according to claim 11, wherein the specular reflection information includes a specular reflection intensity on a surface of the object.
14. The method according to claim 11, wherein the specular reflection information includes a spread width of the specular reflection light on a surface of the object.
15. The method according to claim 11, further comprising dividing the specular reflection information into a plurality of regions,
wherein the compressing compresses the diffuse reflection information for each divided region.
16. A non-transitory computer-readable storage medium storing instructions that, when executed by a computer, cause the computer to perform a method, the method comprising:
acquiring specular reflection information about specular reflection light on an object;
acquiring diffuse reflection information about diffuse reflection light on the object; and
compressing the diffuse reflection information based on the specular reflection information.

17. The non-transitory computer-readable storage medium according to claim 16, wherein the specular reflection information includes normal information on a surface of the object.

18. The non-transitory computer-readable storage medium according to claim 16, wherein the specular reflection information includes a specular reflection intensity on a surface of the object.

19. The non-transitory computer-readable storage medium according to claim 16, wherein the specular reflection information includes a spread width of the specular reflection light on a surface of the object.

20. The non-transitory computer-readable storage medium according to claim 16, further comprising dividing the specular reflection information into a plurality of regions, wherein the compressing compresses the diffuse reflection information for each divided region.

\* \* \* \* \*